(12) United States Patent
Wang

(10) Patent No.: US 7,535,877 B2
(45) Date of Patent: May 19, 2009

(54) WIRELESS COMMUNICATION SYSTEM, METHOD FOR ENHANCING NETWORK EFFICIENCY, AND COMPUTER PROGRAM PRODUCT THEREFOR

(75) Inventor: Shie-Yuan Wang, Hsinchu (TW)

(73) Assignee: Institute for Information Industry, Taipei (TW)

( * ) Notice: Subject to any disclaimer, the term of this patent is extended or adjusted under 35 U.S.C. 154(b) by 476 days.

(21) Appl. No.: 11/347,732

(22) Filed: Feb. 3, 2006

(65) Prior Publication Data

US 2007/0133499 A1 Jun. 14, 2007

(30) Foreign Application Priority Data

Dec. 8, 2005 (TW) ............................ 94143413 A

(51) Int. Cl.
*H04B 7/212* (2006.01)
(52) U.S. Cl. .................. 370/337; 370/338; 370/347; 455/502; 455/68
(58) Field of Classification Search ................ 370/337, 370/338, 347; 455/68, 502
See application file for complete search history.

(56) References Cited

U.S. PATENT DOCUMENTS

2003/0236103 A1* 12/2003 Tamaki et al. ............. 455/552.1
2005/0058101 A1* 3/2005 Khan ......................... 370/335
2005/0105504 A1* 5/2005 Sakoda ...................... 370/349
2006/0077942 A1* 4/2006 Panwar et al. .............. 370/338
2006/0116076 A1* 6/2006 Li et al. ..................... 455/41.2

OTHER PUBLICATIONS

Tobagi, et al., "Packet Switching in Radio Channels: Part II—The Hidden Terminal Problem in Carrier Sense Multiple-Access and the Busy-Tone Solution," *IEEE Transactions on Communications*, vol. Com. 23, No. 12, pp. 1417-1433 (Dec. 1975).
Part 11: Wireless LAN Medium Access Control (MAC) and Physical Layer (PHY) specifications: High-Speed Physical Layer in the 5 GHz Band, *IEEE Std. 802.11a-1999* (*Supplement to IEEE Std. 802.11-1999*, pp. 1-14; (Issued Aug. 10, 2000).

(Continued)

*Primary Examiner*—Danh C Le
(74) *Attorney, Agent, or Firm*—Patterson, Thuente, Skaar & Christensen, P.A.

(57) ABSTRACT

A wireless communication system, a method for enhancing network efficiency, and a computer program product therefor are provided. The wireless communication system includes a transmitting apparatus and a receiving apparatus. The method and the computer program product therefor perform the following steps. The transmitting apparatus transmits a request-to-send packet to the receiving apparatus. After receiving the request-to-send packet, the receiving apparatus measures a request-to-send power of the received request-to-send packet to calculate a clear-to-send power. The receiving apparatus then uses the clear-to-send power to broadcast a clear-to-send packet. All neighboring transmitting apparatuses that can hear this clear-to-send packet should prohibit themselves from sending packets during the period specified in the clear-to-send packet to avoid colliding with a data packet that will soon be sent from the transmitting apparatus to the receiving apparatus.

18 Claims, 2 Drawing Sheets

OTHER PUBLICATIONS

Fall, et al., "The *ns* Manual (formerly *ns* Notes and Documentation)," The VINT Project, pp. 1-315 (Aug. 24, 2000).

Haas, et al., "Dual Busy Tone Multiple Access (DBTMA)—Performance Results," Cornell University, Ithaca, New York (School of Electrical Engineering), pp. 1328-1332 (1999).

Wu et al., "Intelligent Medium Access for Mobile *Ad Hoc* Networks with Busy Tones and Power Control," *IEEE Journal on Selected Areas in Communications*, vol. 18, No. 9, pp. 1647-1657 (Sep. 2000).

Pursley, et al., "Energy-Efficient Transmission and Routing Protocols for Wireless Multiple-Hop Networks and Spread-Spectrum Radios," Clemson University, Clemson, South Carolina (Department of Electrical and Computer Engineering), pp. 1-5 (2000).

Jung, et al., "A Power Control MAC Protocol for Ad Hoc Networks," Texas A&M University, College Station (Dept. of Computer Science), pp. 36-47 (2002).

Kyasanur, et al., "Capacity of Multi-Channel Wireless Networks: Impact of Number of Channels and Interfaces," University of Illinois at Urbana-Champaign (Dept. of Computer Science, and Coordinated Science Laboratory), pp. 1-16 (Mar. 2, 2005).

Akyildiz, et al., "Wireless mesh networks: a survey," *Computer Networks*, Dec. 20, 2004, 43 pages.

Xu, et al., "How Effective is the IEEE 802.11 RTS/CTS Handshake in Ad Hoc Networks?," University of California, Los Angeles (Computer Science Department), Nov. 17, 2002, 6 pages.

Shukla, et al., "Mitigating the Exposed Node Problem in IEEE 802.11 Ad Hoc Networks," Indian Institute of Technology Bombay (K.R. School Of Information Technology), Oct. 20, 2003, pp. 1-6.

Ye, et al., "Improving Spatial Reuse of IEEE 802.11 Based Ad Hoc Networks," Rensselaer Polytechnic Institute, Troy, New York (ECSE Department), Mar. 1, 2003, 5 pgs.

Ye, et al., "Distance-Aware Virtual Carrier Sensing for Improved Spatial Reuse In Wireless Networks," Rensselaer Polytechnic Institute, Troy, New York (ECSE Department), Nov. 29, 2004, 5 pgs.

Zhu, et al., "Adapting Physical Carrier Sensing to Maximize Spatial Reuse In 802.11 Mesh Networks," Intel Corporation, Hillsboro, Oregon (Communications Technology Lab), Dec. 1, 2004, pp. 1-32.

Gomez, et al., "Conserving Transmission Power in Wireless Ad Hoc Networks," Columbia University, New York (Dept. of Electrical Engineering And Center for Telecommunications Research), Nov. 11, 2001, 11 pgs.

Ko, et al., "Medium Access Control Protocols Using Directional Antennas in Ad Hoc Networks," Texas A&M University, College Station, TX (Department of Computer Science), Mar. 1, 2000, 9 pgs.

Chapter 3, *Mobile Radio Propagation: Large Scale Path Loss*, pp. 84-91, prior to Dec. 8, 2005.

Chapter 6, Coding Theory and Cryptography: The Essentials (Second Edition), *Reed-Solomon Codes*, 2000, pp. 127-158.

\* cited by examiner

WIRELESS COMMUNICATION SYSTEM, METHOD FOR ENHANCING NETWORK EFFICIENCY, AND COMPUTER PROGRAM PRODUCT THEREFOR

CROSS-REFERENCES TO RELATED APPLICATIONS

This application claims priority to Taiwan Patent Application No. 094143413 filed on Dec. 8, 2005.

BACKGROUND OF THE INVENTION

1. Field of the Invention

The present invention relates to a communication system and a method for enhancing network efficiency, and a computer program product therefor; specifically to a communication system and a method for enhancing network efficiency by way of dynamically adjusting a clear-to-send power, and a computer program product therefor.

2. Descriptions of the Related Art

Due to the progress of information technology and the development of communication medium in these years, network has become one of the inevitable communication mediums. Among them, wireless mash network (WMN) is an attractive approach for corporations, campuses, and locations that are not prone to establish wired networks because of its convenience of setting-up and widely usage range.

When packets are transmitted under the IEEE 802.11 protocol, collisions and unnecessary transmission suppressions occur frequently, wherein the unnecessary transmission suppressions are also known as the exposed-terminal problem. For example, referring to FIG. 1, when a first node 11 intends to transmit a first packet 12 to a second node 13, the first node 11 first transmits a request-to-send packet to the second node 13. The second node 13 responds a clear-to-send packet to the first node 11. The first node 11 then transmits the first packet 12 to the second node 13 after receiving the clear-to-send packet. The second node 13 finally transmits an acknowledge packet to the first node 11 to acknowledge the safe receipt and the process of a packet transmission is done. However, if a third node 15 is going to transmit a second packet 14 to a fourth node 17 at the time the first node 11 transmits the request-to-send packet to the second node 13, the third node 15 will temporarily stop transmitting a request-to-send packet to the fourth node 17 to prevent from collision since the third node 15, located in the signal coverage area 19 of the first node 11, is aware of the request-to-send packet transmitted by the first node 11. After the first node 11 finishes the transmission of the first packet 12, the transmission of the second packet 14 continues.

One can observe from FIG. 1 that the signal coverage area 16 of the third node 15 does not cover the second node 13. In other words, the transmission of the second data 14 from the third node 15 to the fourth node 17 does not affect the second node 13 to receive the first packet 12. That is, when the third node 15 transmits the second packet 14 to the fourth node 17, the transmission does not collide with the operations of the second node 13. Theoretically, the first packet 12 and the second packet 14 may be transmitted simultaneously. The exposed terminal problem degrades the usage rate of a network, reduces the total data amount of parallel transmission in a network, and, hence, wastes bandwidths.

One of the conventional solutions to the exposed terminal problem is to implant a GPS receiver in every node. When a node intends to transmit a packet, the node provides its location information obtained from the GPS receiver in a request-to-send packet and a receiving node also provides its location information in a clear-to-send packet. Consequently, other nodes can determine whether to suppress transmission according to the location information in the request-to-send packet and the clear-to-send packet. The total data amount of parallel transmission increases thereby. Nevertheless, obtaining location information through GPS receivers is costly, and GPS receivers have a distortion range of tens meters.

Accordingly, conventional solutions to the exposed-terminal problem are costly and inaccurate. A solution having advantages of no need of extra hardware and high accuracy to increase the total data amount of parallel transmission is still desired in this field.

SUMMARY OF THE INVENTION

An object of this invention is to provide a wireless communication system for enhancing network efficiency. The wireless communication system comprises a transmitting apparatus and a receiving apparatus. The transmitting apparatus transmits a request-to-send packet. The receiving apparatus receives the request-to-send packet, measures a request-to-send power of the received request-to-send packet, calculates a clear-to-send power in response to the request-to-send power, and then broadcasts a clear-to-send packet with the clear-to-send power.

Another object of this invention is to provide a wireless communication method for enhancing network efficiency. The method comprises the steps of: transmitting a request-to-send packet; receiving the request-to-send packet; measuring a request-to-send power of the received request-to-send packet; calculating a clear-to-send power in response to the request-to-send power; and broadcasting a clear-to-send packet with the clear-to-send power.

Another object of this invention is to provide a computer program product for storing a computer program, which executes the aforementioned wireless communication method.

The invention can adjust a clear-to-send power adequately in response to a measured request-to-send power to prevent from unnecessary suppression of transmissions among other apparatuses which are affected by an unnecessarily-large initial clear-to-send power. The invention does not require extra hardware devices, so the cost can be reduced. In addition, by using the calculated clear-to-send power for the transmission, the power consumption can be saved and the total data amount of parallel transmission can be increased.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
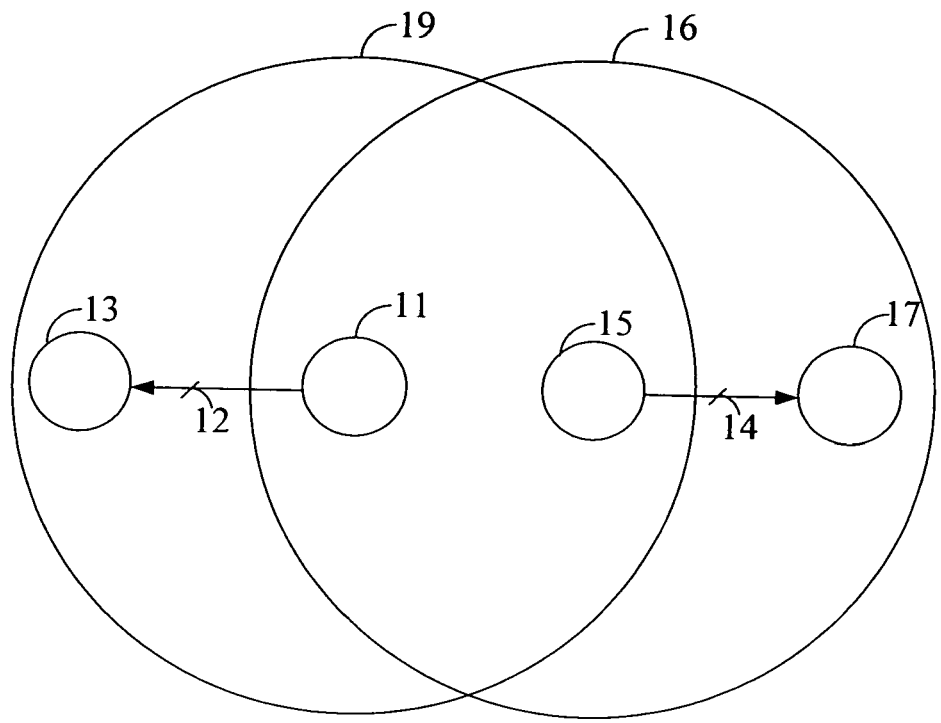
FIG. 1 illustrates the exposed-terminal problem.
Figure 2:
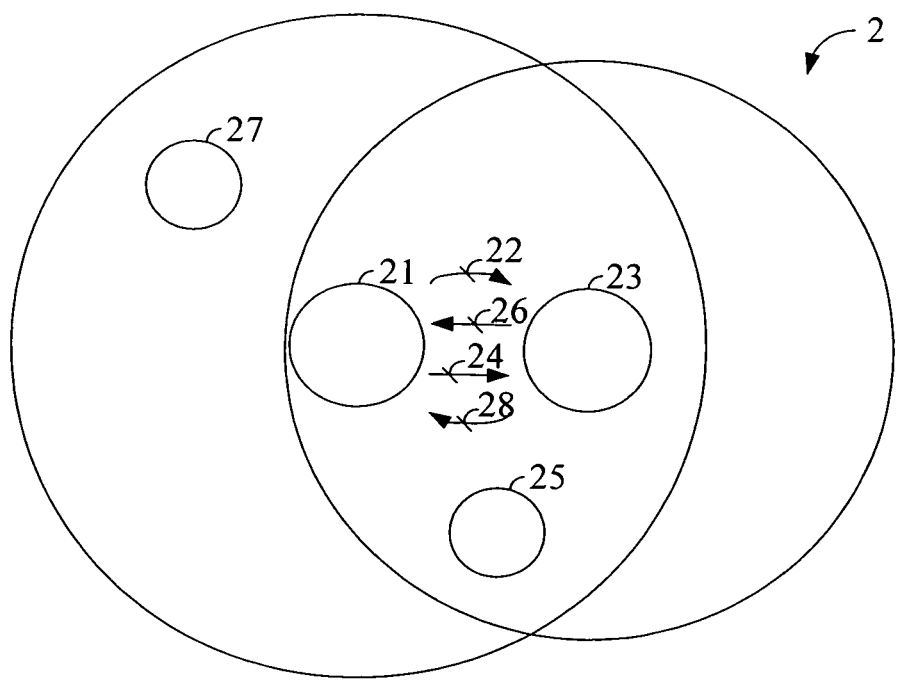
FIG. 2 illustrates a first embodiment of this invention.

A first embodiment of this invention is illustrated in FIG. 2, which is a wireless communication system capable of enhancing network efficiency. The wireless communication system 2 comprises a transmitting apparatus 21 and a receiving apparatus 23. When the transmitting apparatus 21 intends to transmit a data packet 24 to the receiving apparatus 23, the transmitting apparatus 21 first transmits a request-to-send packet 22 to the receiving apparatus 23. When receiving the request-to-send packet 22, the receiving apparatus 23 measures a request-to-send power of the received request-to-send packet 22, calculates a clear-to-send power in response to the request-to-send power, and then transmits a clear-to-send packet 26 to the transmitting apparatus 21 with the calculated clear-to-send power. In this embodiment, the wireless communication system 2 follows the architecture of the IEEE 802.11 medium access control (MAC) layer protocol.

More specifically, the receiving apparatus 23 broadcasts the clear-to-send packet 26 to the transmitting apparatus 21 with the calculated clear-to-send power. The transmitting apparatus 21 transmits the data packet 24 to the receiving apparatus 23 with a predetermined power after receiving the clear-to-send packet 26. After receiving the data packet 24, the receiving apparatus 23 transmits an acknowledge packet 28 to the transmitting apparatus 21 with a predetermined power to acknowledge the safe receipt of the data packet 24.

The clear-to-send packet 26 is used to inform all neighboring transmitting apparatuses, e.g. a transmitting apparatus 25, to temporarily suppress transmitting a packet within a designated time interval indicated in the clear-to-send packet 26 in order to avoid colliding with the transmission of the data packet 24. If there is any other transmitting apparatus or receiving apparatus, e.g. a receiving apparatus 27, located within the area covered by a predetermined clear-to-send power but not within the area covered by the aforementioned calculated clear-to-send power, the other transmitting apparatus or receiving apparatus will not receive the clear-to-send packet 26. Therefore, transmissions of the other transmitting apparatus and receiving apparatus will not be affected.

The following is the descriptions for calculating the clear-to-send power in accordance with this invention.

The request-to-send power and the clear-to-send power are in inverse proportion. This is because the larger the request-to-send power received by the receiving apparatus 23, the less the signal decays. Consequently, the receiving apparatus 23 may use a smaller clear-to-send power to define a smaller area in which any transmissions of neighboring apparatuses are suppressed.

The receiving apparatus 23 also calculates the clear-to-send power in response to a predetermined transmission power. The predetermined transmission power, i.e., an initial value of the clear-to-send power is in direct proportion to the clear-to-send power. That is, the larger the predetermined transmission power is, the larger the calculated clear-to-send power will be.

The receiving apparatus 23 also calculates the clear-to-send power in response to a minimum reception power, wherein the minimum reception power is a minimum power required by the receiving apparatus 23 to successfully receive a packet. It is a predetermined value. The minimum reception power and the clear-to-send power are in direct proportion. That is, the larger the minimum reception power is, the larger the calculated clear-to-send power will be.

The receiving apparatus 23 also calculates the clear-to-send power in response to a predetermined signal-to-interference ratio (SIR). The signal-to-interference ratio is a predetermined value indicating an acceptable signal-to-interference ratio. In this embodiment the value is 10. The predetermined signal-to-interference ratio and the clear-to-send power are in direct proportion. That is, the larger the predetermined signal-to-interference ratio is, the larger the calculated clear-to-send power will be.

In conclusion, the receiving apparatus 23 calculates the clear-to-send power based on the following equation:

$$P_{cts} \geq P_t \left( \frac{RXThres}{P_{rts}} \right) CPThres,$$

wherein $P_{cts}$ is the calculated clear-to-send power, $P_t$ is the predetermined transmission power, RXThres is the minimum reception power, $P_{rts}$ is the measured request-to-send power, and CPThres is the predetermined signal-to-interference ratio. When the wireless communication system 2 needs to reduce power consumption, the minimum of the calculated clear-to-send power may be derived by:

$$P_t \left( \frac{RXThres}{P_{rts}} \right) CPThres.$$

Figure 3:
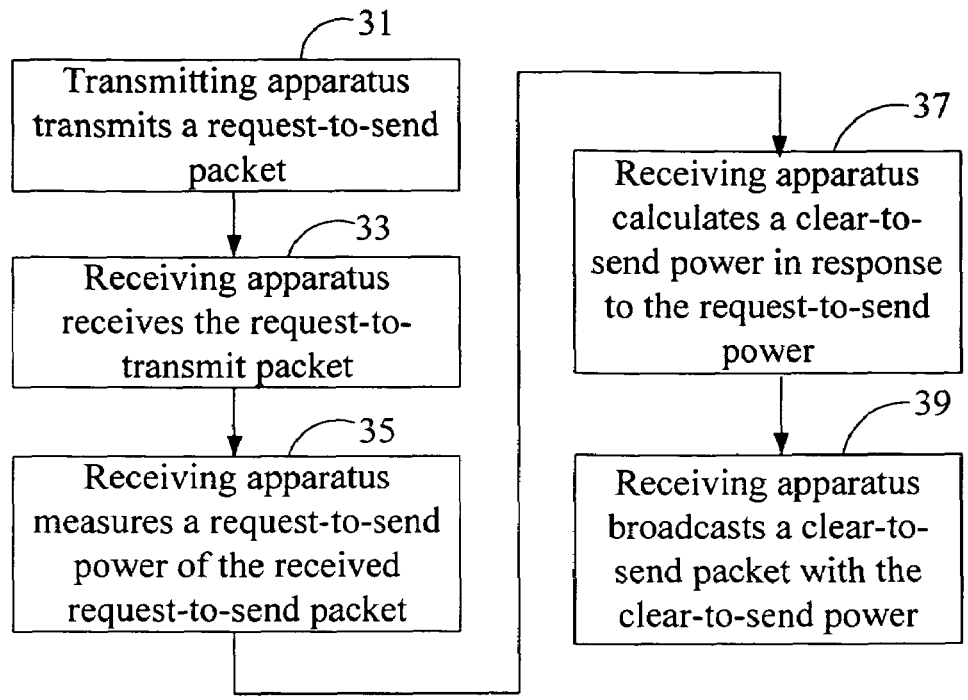
FIG. 3 illustrates a flow chart of a second embodiment of this invention.

A second embodiment is illustrated in FIG. 3, which is a wireless communication method for enhancing network efficiency. The method is used in a wireless communication system which comprises a transmitting apparatus and a receiving apparatus. In step 31, the transmitting apparatus transmits a request-to-send packet. Then step 33 is executed wherein the receiving apparatus receives the request-to-send packet. Then step 35 is executed wherein the receiving apparatus measures a request-to-send power of the received request-to-send packet. Then step 37 is executed wherein the receiving apparatus calculates a clear-to-send power in response to the request-to-send power. Finally in step 39, the receiving apparatus broadcasts a clear-to-send packet with the calculated clear-to-send power to the transmitting apparatus and all neighboring transmitting apparatuses. The method for calculating the clear-to-send power in the second embodiment is similar to that in the first embodiment.

Figure 4:
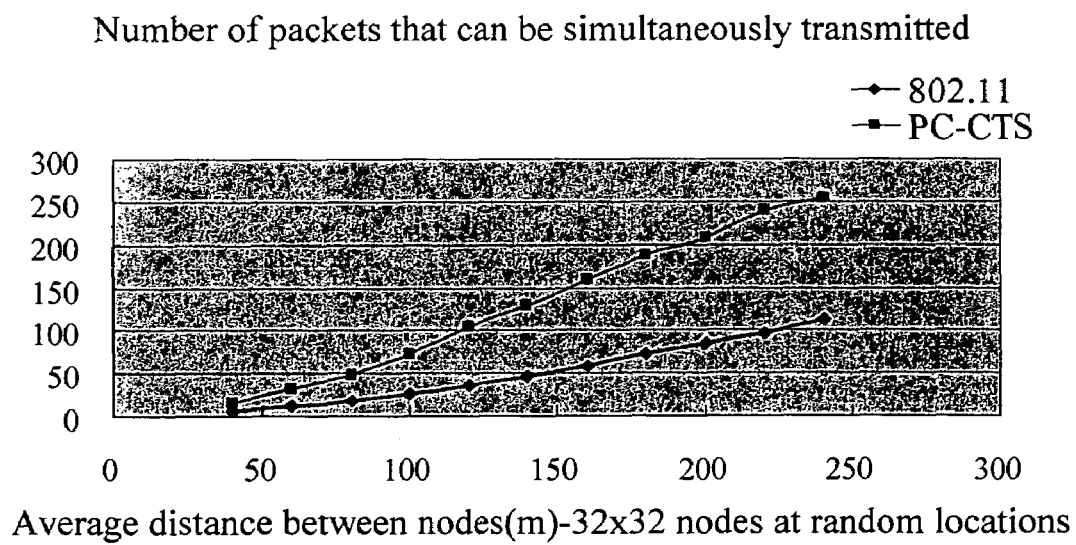
FIG. 4 is simulation results run by a network simulator.

A simulation result is shown in FIG. 4, wherein the simulation conditions are under the IEEE 802.11 wireless local area network (WLAN) with a two-ray ground reflection model. The PC-CTS curve shows the simulation result in accordance with this invention, and the 802.11 curve shows the simulation result without using this invention. The simulation uses 32×32 randomly distributed nodes. FIG. 4 tells that the number of nodes that can simultaneously transmit a packet in this invention is almost twice as many as that without using this invention.

The method of the second embodiment may be executed by using a computer program product which stores a computer program. The computer program comprises code to execute the above-mentioned steps of the method. The computer program product can be a floppy disk, a hard disk, an optical disc, a flash disk, a tape, an internet accessible database or any storage medium with a similar functionality of storage which is easily thought by people skilled in the field.

By way of controlling the clear-to-send power dynamically without extra hardware devices, this invention may fully use the bandwidth of the network. The cost is, hence, reduced.

The above embodiments are used as the examples of the subject invention and used to explain the technical characters of the subject invention and are not used to limit the range of the subject invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication system for enhancing network efficiency, comprising:
    a transmitting apparatus for transmitting a request-to-send packet; and
    a receiving apparatus for receiving the request-to-send packet, measuring a request-to-send power of the received request-to-send packet, and calculating a clear-to-send power in response to the request-to-send power;
    wherein the receiving apparatus broadcasts a clear-to-send packet with the clear-to-send power, the clear-to-send packet is used to inform a neighboring transmitting apparatus of temporarily suppressing transmitting a packet within a designated time interval indicated in the clear-to-send packet.

2. The wireless communication system as claimed in claim 1, wherein the request-to-send power is in inverse proportion to the clear-to-send power.

3. The wireless communication system as claimed in claim 1, wherein the receiving apparatus calculates the clear-to-send power in response to a predetermined transmission power, and the predetermined transmission power is in direct proportion to the clear-to-send power.

4. The wireless communication system as claimed in claim 1, wherein the receiving apparatus calculates the clear-to-send power in response to a minimum reception power, the minimum reception power is a minimum power required by the receiving apparatus to receive a packet successfully, and the minimum reception power is in direct proportion to the clew-to-send power.

5. The wireless communication system as claimed in claim 1, wherein the receiving apparatus calculates the clear-to-send power in response to a predetermined signal-to-interference ratio, and the predetermined signal-to-interference ratio is in direct proportion to the clear-to-send power.

6. The wireless communication system as claimed in claim 1, wherein the receiving apparatus calculates the clear-to-send power based on the following equation:

$$P_{cts} \geq P_t \left( \frac{RXThres}{P_{rts}} \right) CPThres$$

Wherein Pcts is the clear-to-send power, Pt is a predetermined transmission power, RXThres is a minimum reception power required by the receiving apparatus to receive a packet successfully, Prts is the request-to-send power, and CPThres is a predetermined signal-to-interference ratio.

7. A wireless communication method for enhancing network efficiency, comprising:
    transmitting a request-to-send packet;
    receiving the request-to-send packet;
    measuring a request-to-send power of the received request-to-send packet;
    calculating a clear-to-send power in response to the request-to-send power; and
    broadcasting a clear-to-send packet with the clear-to-send power;
    wherein the clear-to-send packet is used to inform a neighboring transmitting apparatus of temporarily suppressing transmitting a packet within a designated time interval indicated in the clear-to-send packet.

8. The wireless communication method as claimed in claim 7, wherein the request-to-send power is in inverse proportion to the clear-to-send power.

9. The wireless communication method as claimed in claim 7, wherein the step of calculating a clear-to-send power responds to a predetermined transmission power, and the predetermined transmission power is in direct proportion to the clear-to-send power.

10. The wireless communication method as claimed in claim 7, wherein the step of calculating a clear-to-send power responds to a minimum reception power, the minimum reception power is a minimum power required to receive a packet successfully, and the minimum reception power is in direct proportion to the clear-to-send power.

11. The wireless communication method as claimed in claim 7, wherein the step of calculating a clear-to-send power responds to a predetermined signal-to-interference ratio, and the predetermined signal-to-interference ratio is in direct proportion to the clear-to-send power.

12. The wireless communication method as claimed in claim 7, wherein the step of calculating a clear-to-send power is based on the following equation:

$$P_{cts} \geq P_t \left( \frac{RXThres}{P_{rts}} \right) CPThres$$

Wherein Pcts is the clear-to-send power, Pt is a predetermined transmission power, RXThres is a minimum reception power required to receive a packet successfully, Prts is the request-to-send power, and CPThres is a predetermined signal-to-interference ratio.

13. A computer storage medium for storing a computer program to execute a wireless communication method for enhancing network efficiency, the wireless communication method being adapted for a communication wireless system, the wireless communication system comprising a transmitting apparatus and a receiving apparatus, the computer program comprising:
    code for driving the transmitting apparatus to transmit a request-to-send packet;
    code for driving the receiving apparatus to receive the request-to-send packet;
    code for driving the receiving apparatus to measure a request-to-send power of the received request-to-send packet;
    code for driving the receiving apparatus to calculate a clear-to-send power in response to the request-to-send power; and
    code for driving the receiving apparatus to broadcast a clear-to-send packet with the clear-to-send power:;
    wherein the clear-to-send packet is used to inform a neighboring transmitting apparatus of temporarily suppressing transmitting a packet within a designated time interval indicated in the clear-to-send packet.

14. The computer storage medium as claimed in claim 13, wherein the request-to-send power is in inverse proportion to the clear-to-send power.

15. The computer storage medium as claimed in claim 13, wherein the clear-to-send power is calculated in response to a predetermined transmission power, and the predetermined transmission power is in direct proportion to the clear-to-send power.

16. The computer storage medium as claimed in claim 13, wherein the clear-to-send power is calculated in response to a minimum reception power, the minimum reception power is a minimum power required by the receiving apparatus to receive a packet successfully, and the minimum reception power is in direct proportion to the clear-to-send power.

17. The computer storage medium as claimed in claim 15, wherein the clear-to-send power is calculated in response to a predetermined signal-to-interference ratio, and the predetermined signal-to-interference ratio is in direct proportion to the clear-to-send power.

18. The computer storage medium as claimed in claim 13, wherein the clear-to-send power is calculated based on the following equation:

$$P_{cts} \geq P_t \left( \frac{RXThres}{P_{rts}} \right) CPThres$$

Wherein Pcts is the clear-to-send power, Pt is a predetermined transmission power, RXThres is a minimum reception power, Pit is the request-to-send power, and CPThres is a predetermined signal-to-interference ratio.

* * * * *